(12) United States Patent
Chou et al.

(10) Patent No.: US 7,480,449 B2
(45) Date of Patent: Jan. 20, 2009

(54) IMAGE DETECTION MODULE

(75) Inventors: Tsung-Ling Chou, Taichung (TW); Mu-Yuan Wu, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 351 days.

(21) Appl. No.: 11/425,543

(22) Filed: Jun. 21, 2006

(65) Prior Publication Data

US 2007/0188965 A1 Aug. 16, 2007

(30) Foreign Application Priority Data

Feb. 10, 2006 (TW) .............................. 95104578 A

(51) Int. Cl.
  *G03B 17/00* (2006.01)
  *H04N 5/228* (2006.01)
(52) U.S. Cl. .................................... 396/55; 348/208.99
(58) Field of Classification Search .................. 396/52, 396/55; 348/208.99, 208.4, 208.7, 208.11; 250/208.1, 216; 359/554; 310/12, 17
See application file for complete search history.

(56) References Cited

U.S. PATENT DOCUMENTS

| 5,266,988 A | 11/1993 | Washisu | |
|---|---|---|---|
| 7,315,015 B2 * | 1/2008 | Hsieh et al. | 250/208.1 |
| 2006/0017815 A1 * | 1/2006 | Stavely et al. | 348/208.7 |
| 2007/0189743 A1 * | 8/2007 | Chou et al. | 396/55 |

FOREIGN PATENT DOCUMENTS

JP  2003111449  11/2003

* cited by examiner

*Primary Examiner*—W. B. Perkey
*Assistant Examiner*—Minh Phan
(74) *Attorney, Agent, or Firm*—Thomas, Kayden, Horstemeyer & Risley

(57) ABSTRACT

An image detection module comprises a base, a seat movably disposed on the base, an image detection unit on the seat, a first guide member by which the seat is joined to the base, moving relative to the base, a first coil on either the base or the seat, a first magnet on either the base or the seat and opposite to the first coil, a first metal element on either the base or the seat, corresponding to the first magnet and the first coil between the first magnet an the first metal element, and a first Hall element on either the base or the seat and adjacent to the first coil. A magnetic force is generated between the first coil, the first magnet and the first metal element by a voltage provided to the first coil, moving the seat along the first axis along the first guide element.

14 Claims, 9 Drawing Sheets

IMAGE DETECTION MODULE

BACKGROUND OF THE INVENTION

1. Field of the Invention

The invention relates to an image detection module, and in particular to an image detection module having an image detection unit with 2-dimensional motion.

2. Description of the Related Art

Referring to FIG. 1, U.S. Pat. No. 5,266,988 discloses an image shake suppressing device for a camera. The image shake suppressing device is mounted in a lens 32. When the camera is used, angular velocity meters 33p and 33y measure the angular velocity of the moving camera and provide the measured data to a circuit to drive driving parts 37p and 37y moving the lens 32 along a vertical optical axis, thereby compensating or suppressing blur due to vibration of the camera.

Because the lens, however, is moved along a vertical optical axis, the MTF value thereof is reduced. The compensation method has limited compensation effect and may reduce image quality.

Referring to FIG. 2, Japan patent No. 3551174 discloses a moving mechanism. The moving mechanism employs piezoelectric elements 35 to drive a shaft 34 so as to move an image detection unit 16, such as CCD, in a vertical direction, such that blur can be compensated or suppressed, and it is applicable to any lens.

The piezoelectric elements must be driven by voltage to move the CCD. As the CCD, however, is heavier than a single lens, a large piezoelectric element is needed, increasing the volume of the camera.

BRIEF SUMMARY OF INVENTION

An image detection module comprises a base, a seat movably disposed on the base, an image detection unit on the seat, a first guide member by which the seat is joined to the base, moving relative to the base, a first coil on either the base or the seat, a first magnet on either the base or the seat and opposite to the first coil, a first metal element on either the base or the seat, corresponding to the first magnet and the first coil between the first magnet and the first metal element, and a first Hall element on either the base or the seat and adjacent to the first coil. A magnetic force is generated between the first coil, the first magnet and the first metal element by a voltage provided to the first coil, moving the seat in the first axis along the first guide element.

The first guide element comprises a plurality of first holding portions disposed on the base and the seat respectively, and a pair of first shafts held parallel by the first holding portions, whereby the seat is joined to the base, the seat moving along the axis of the first shaft.

The seat further comprises a movable plate movably disposed on the seat, and a circuit board joined to the movable plate, whereby the image detection unit is electrically connected to the circuit board and fixed on the base.

The image detection module further comprises a second guide element by which the movable plate is joined to the seat and moves relative to the seat in a second axis, a second coil disposed on either the base or the movable plate, a second magnet disposed on either the base or the movable plate and opposite to the second coil, a second metal element disposed on either the base or the seat and corresponding to the second magnet and the second coil between the second magnet and the second metal element, and a second Hall element disposed on either the base or the movable plate and adjacent to the second coil. A magnetic force is generated between the second coil, the second magnet and the second metal element by a voltage provided to the second coil, thereby moving the seat along the second guide element in the second axis.

The second guide element comprises a plurality of second holding portions disposed on the seat and the movable plate respectively, and a pair of second shafts held parallel by the second holding portions, whereby the movable plate is joined to the seat and moves along the axis of the second shaft.

The first and second metal elements can be metal plates.

The axis of the second shaft is perpendicular to the axis of the first shaft.

BRIEF DESCRIPTION OF DRAWINGS

The invention can be more fully understood by reading the subsequent detailed description and examples with references made to the accompanying drawings, wherein:

FIG. 7c is a cross section of FIG. 7a; and

DETAILED DESCRIPTION OF INVENTION

Before the description, it is noted that location language, such as first axis X, second axis Y, or third axis Z, is based on the coordinate of each individual figure, and the first axis X, second axis Y, and the third axis Z are orthogonal.

Figure 1:
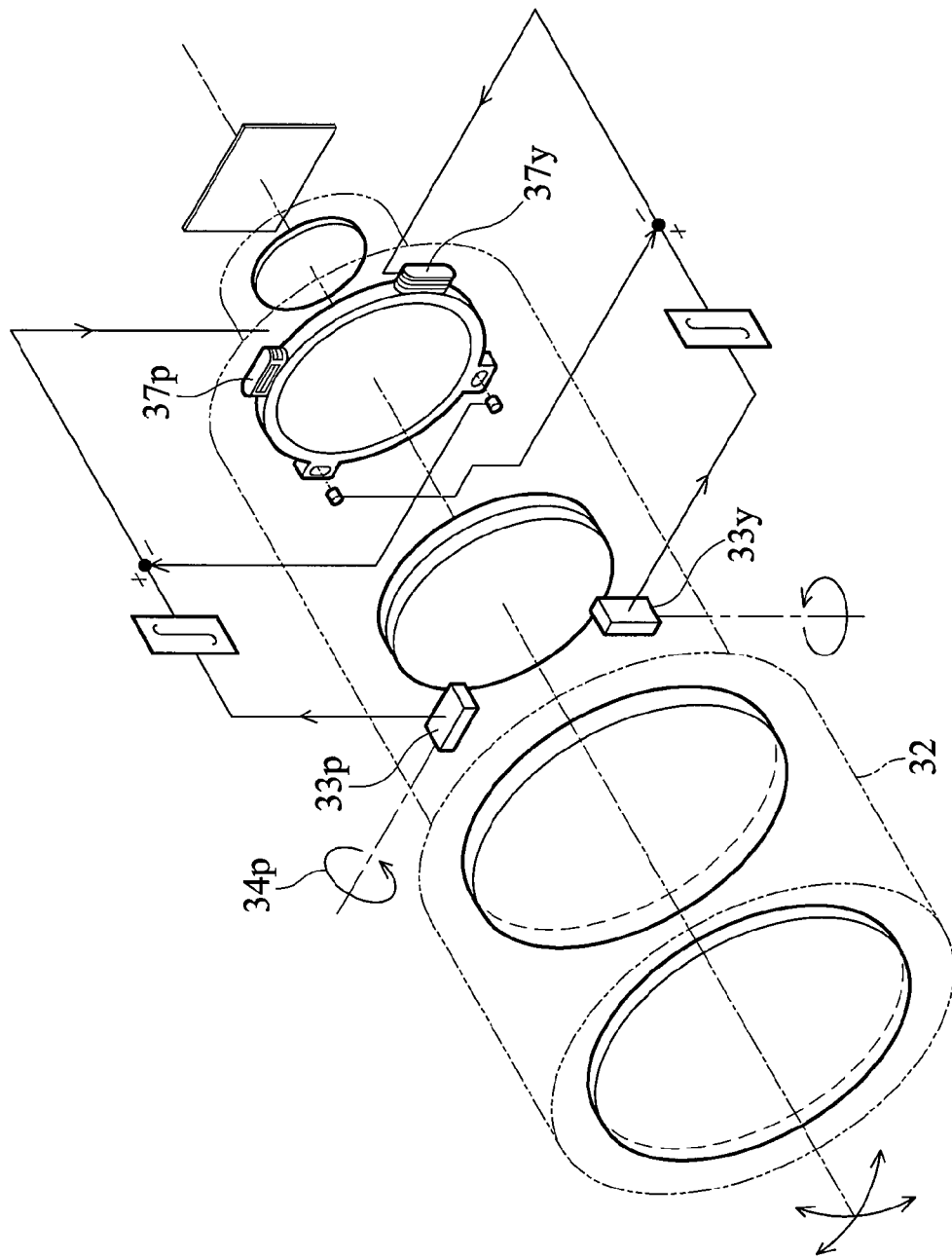
FIG. 1 depicts an image shake suppressing device disclosed in U.S. Pat. No. 5,266,988.
Figure 2:
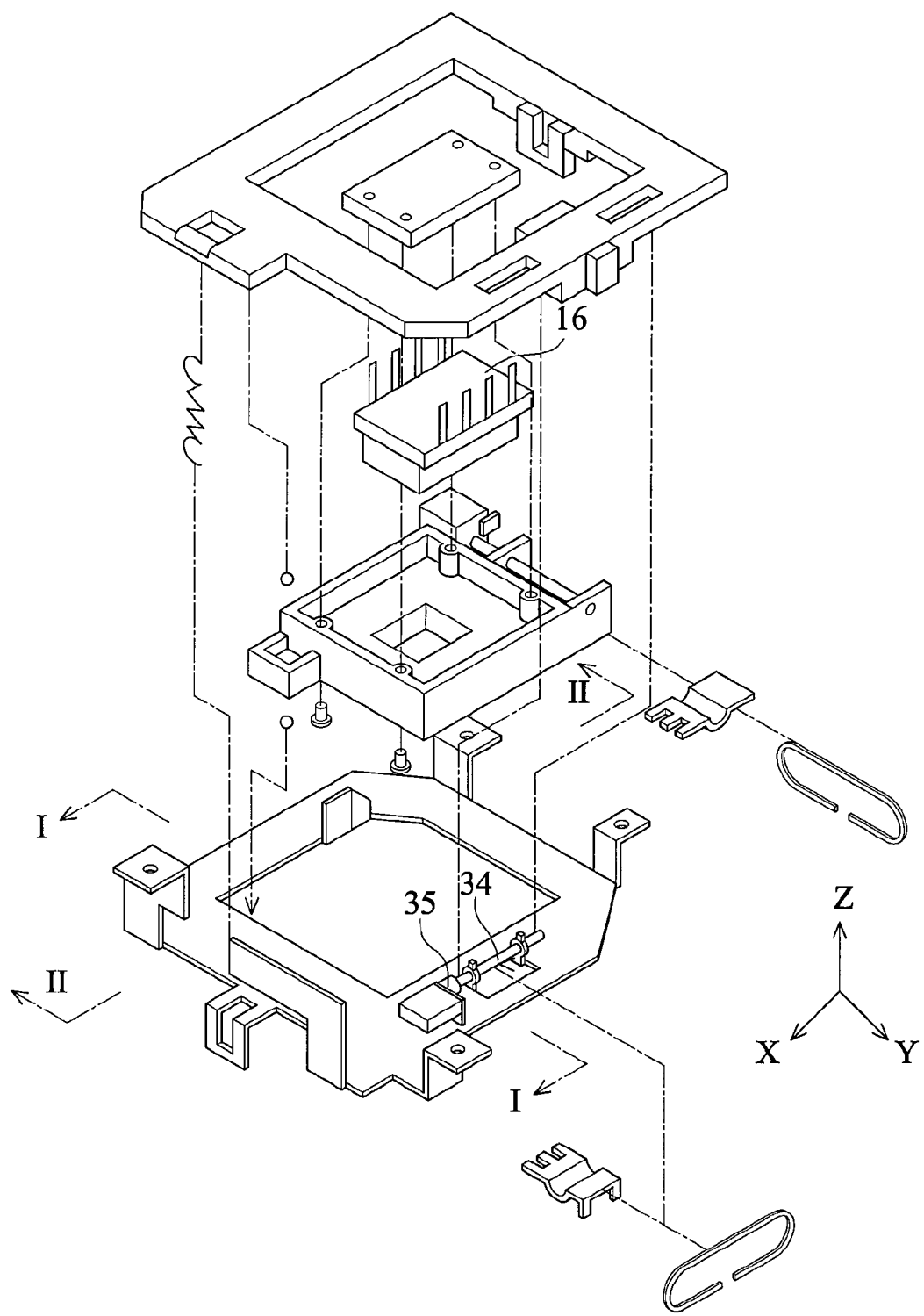
FIG. 2 depicts a moving mechanism disclosed in Japan Patent No. 3551174.
Figure 3:
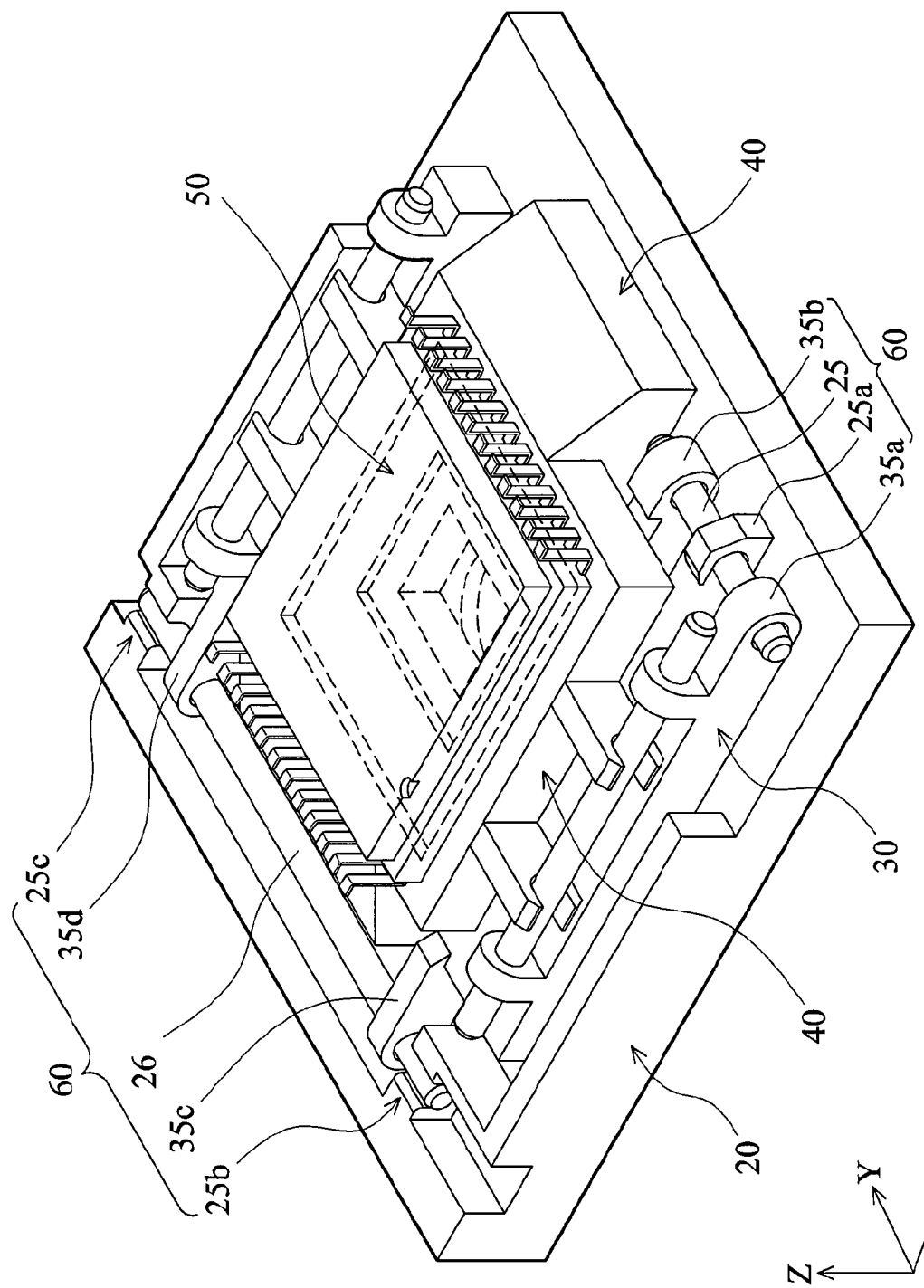
FIG. 3 is a perspective view of an embodiment of an image detection module of the invention.

Referring to FIG. 3, an embodiment of an image detection module of the invention comprises a base 20 with a hollow portion 29, a seat 30 disposed in the hollow portion 29, a movable plate 40 disposed in the seat 30, and an image detection unit 50 (such as a CCD) disposed on the movable plate 40. The sensing surface of the image detection unit 50 faces opposite the third axis Z.

Figure 4:
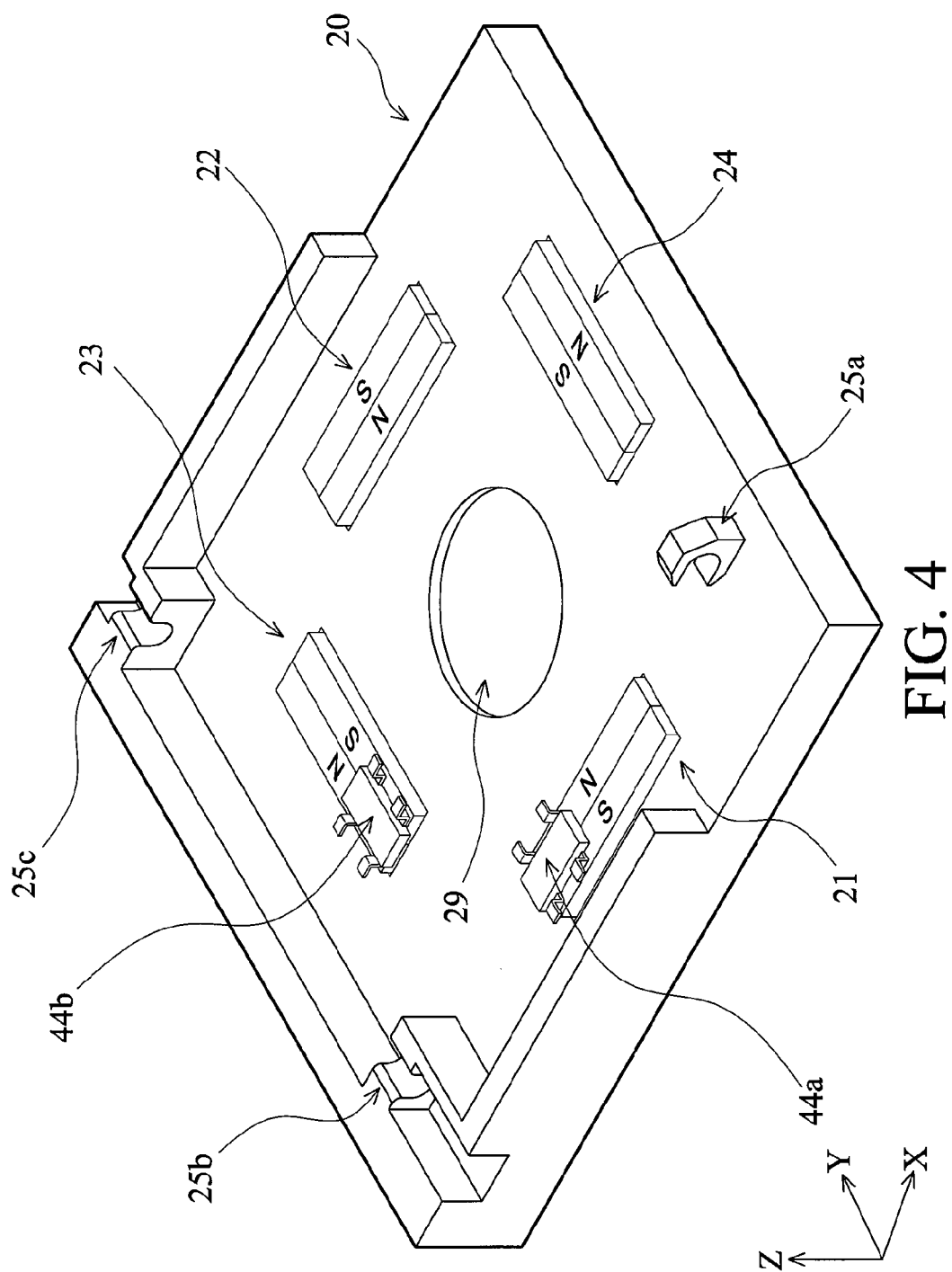
FIG. 4 is a rear view of a base of the image detection module.
Figure 5:
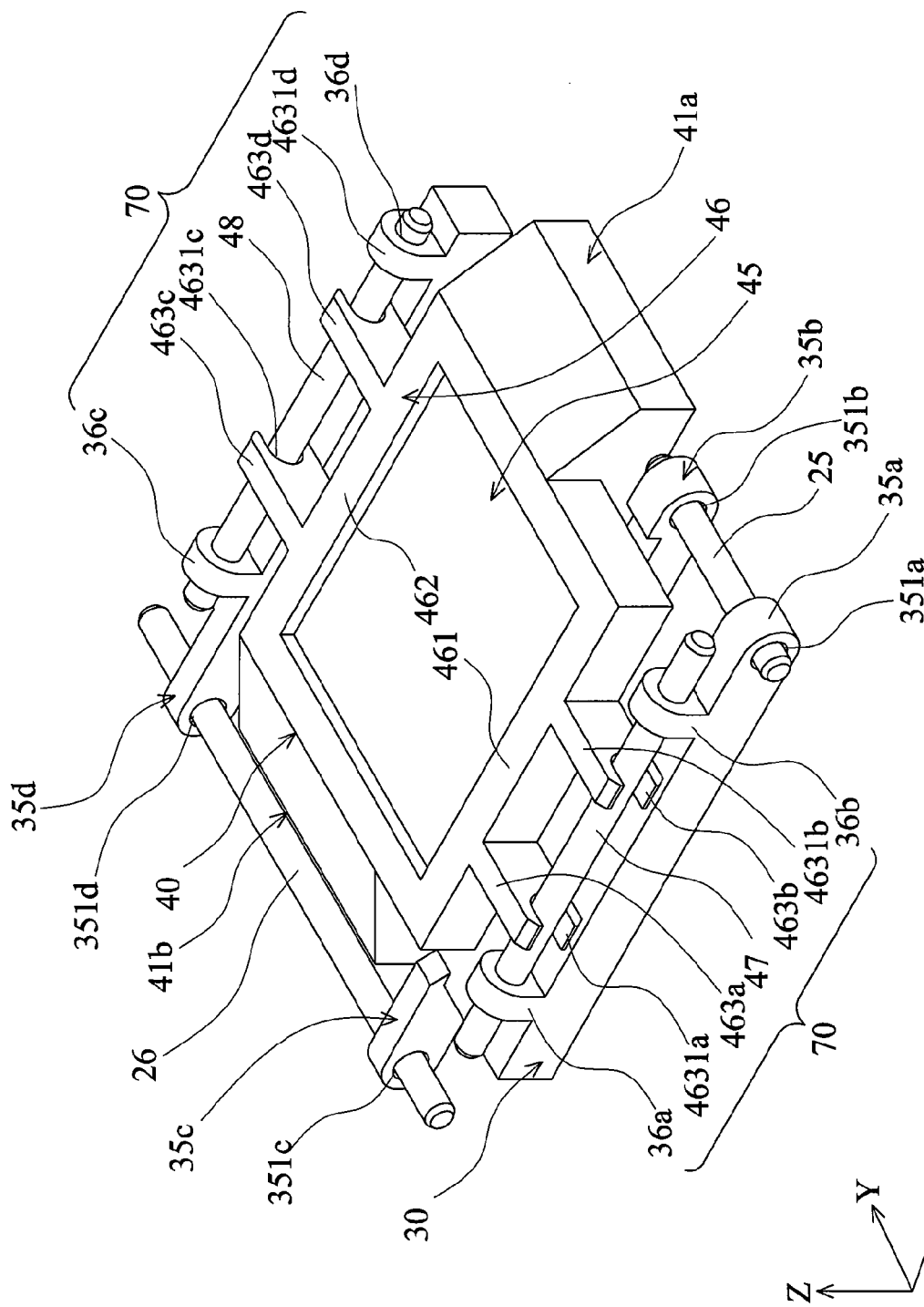
FIG. 5 is a perspective view of a seat with a movable plate of the embodiment of the invention.

Referring to FIGS. 4 and 5, the base 20 comprises a pair of first magnets 21 and 22, a pair of second magnets 23 and 24 and a pair of parallel first shafts 25 and 26. The first magnet 21 and 22 are disposed parallel on two sides of the hollow portion 29. The N pole and S pole of the first magnet 21 are disposed along the first axis X, and the N pole and S pole of the first magnet 22 are also disposed along the first axis X. The second magnets 23 and 24 are disposed parallel on two sides of the hollow portions 29. The N pole and the S pole of the second magnet 23 are disposed along the second axis Y, and the N pole and the S pole of the other second magnet 24 are also disposed along the second axis Y. In addition, N poles of the first magnet 21 and 22 face the hollow portion 29, and the S poles of the second magnet 23 and 24 face the hollow portion 29.

Figure 6:
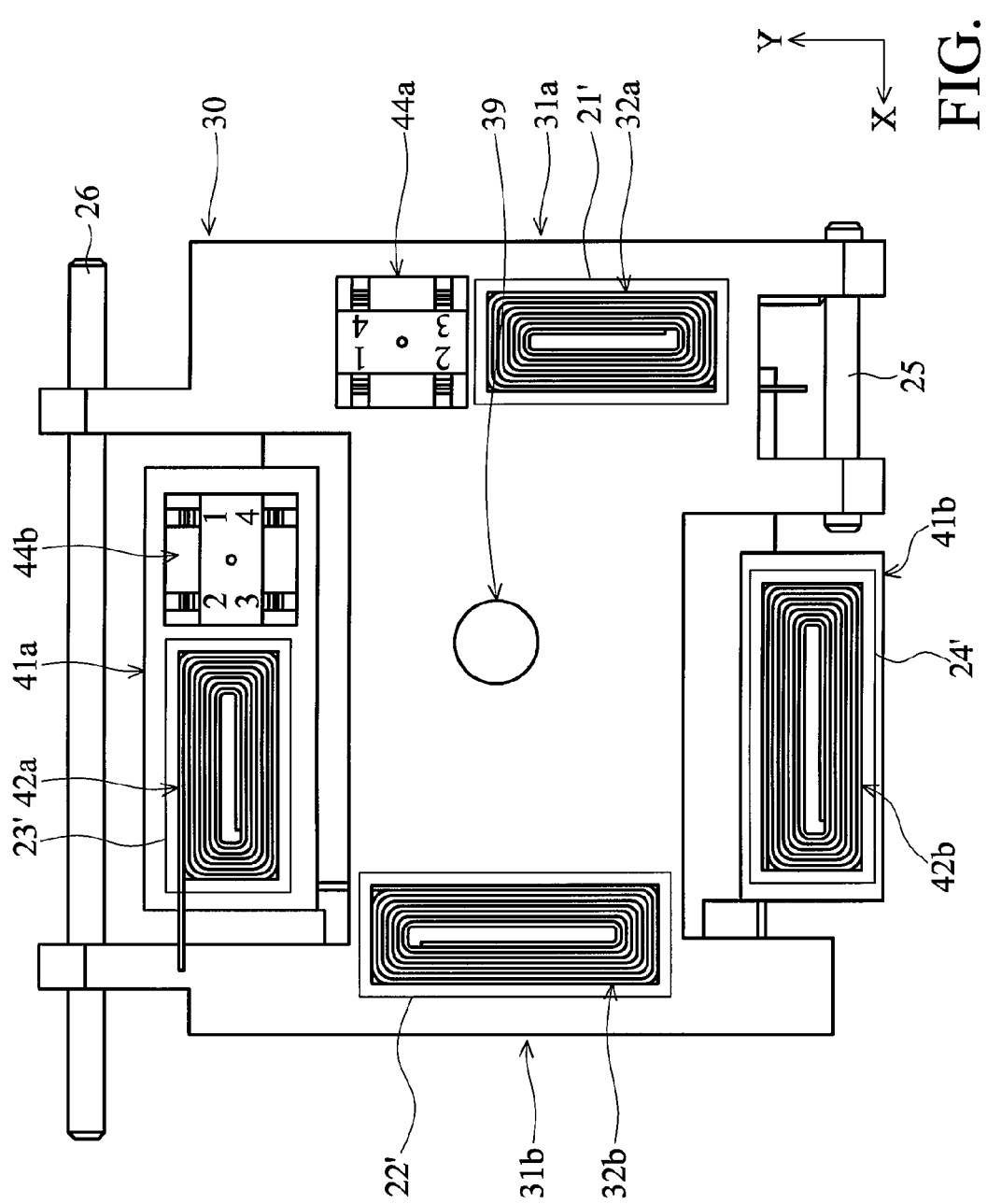
FIG. 6 is a rear view of a seat with a movable plate of the embodiment of the invention.
Figure 7B:
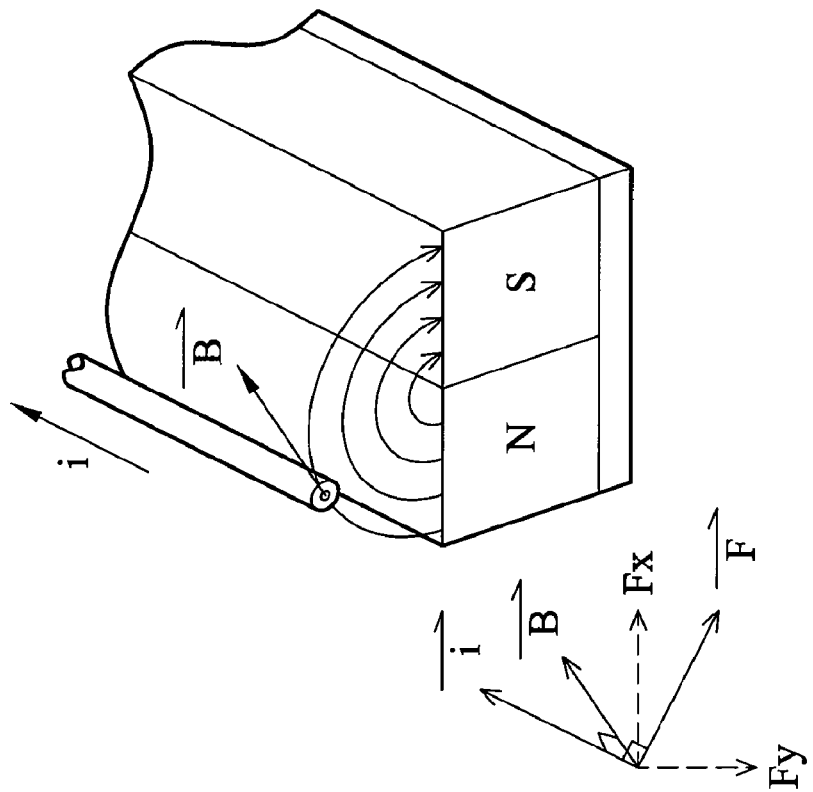
FIG. 7b depicts a coil with current in a magnetic field.
Figure 7A:
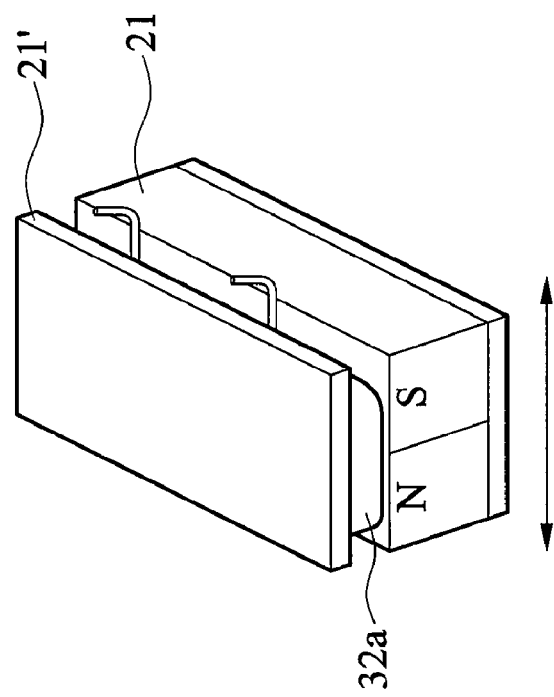
FIG. 7a depicts the assembly of the first magnet, the first coil and the first metal element.

Referring to FIGS. 5 and 6, the seat 30 has two wing portions 31a and 31b. A pair of first coils 32a and 32b, a pair of first metal element 21' and 22' and a first Hall element 44a are disposed on the wing portions 31a and 31b respectively. The first metal element 21' corresponding to the first magnet 21 is disposed on the wing portion 31a. The first Hall element 44a adjacent to the first metal element 21' is also disposed on the wing portion 31a. The first coil 32a is between the first magnet 21 and the first metal element 21'. The first magnet 21 is parallel to the first auxiliary 21'. The N pole of the first auxiliary 21' corresponds to the S pole of the first magnet 21, and the S pole of the first auxiliary 21' corresponds to the N pole of the first magnet 21, as shown in FIG. 7a. The first metal element 22' is also disposed on the wing portion 31b. Similarly, the first coil 32b is between the first magnet 22 and the first metal element 22'. The first magnet 22 is parallel to the first metal element 22'. The first coils 32a and 32b are substantially rectangular and their longitudinal sides are parallel. In this embodiment, the first metal elements 21' and 22' can be ferromagnetic metal plates.

The movable plate 40 also has two wing portions 41a and 41b. A pair of first coils 32a and 32b and a pair of first auxiliary magnets 21' and 22' are disposed on the wing portions 31a and 31b respectively, and a first Hall element 44a is disposed on wing portion 31a. The second metal element 23' corresponding to the second magnet 41 is disposed on the wing portion 41a. The second Hall element 44a adjacent to the second metal element 23' is also disposed on the wing portion 41a. The second coil 42a is between the second magnet 41 and the second metal element 23'. The second magnet 41 is parallel to the second auxiliary magnet 23'. The N pole of the second auxiliary magnet 23' corresponds to the S pole of the second magnet 41, and the S pole of the second auxiliary magnet 23' corresponds to the N pole of the second magnet 41. The second metal element 24' is also disposed on the wing portion 41b. Similarly, the second coil 42b is between the second magnet 42 and the second metal element 24'. The second magnet 42 is parallel to the second metal element 24'. The second coils 42a and 42b are also substantially rectangular, and their longitudinal sides are parallel. In this embodiment, the second metal elements 23' and 24' can be ferromagnetic metal plates. Two first holding portions 35a and 35b are disposed on the seat 30 adjacent to the wing portion 41a. The first holding portions 35a and 35b have holes 351a and 351b respectively; two first holding portions 35c and 35d are disposed on the seat 30 adjacent to another wing portion 41b. The first holding portions 35c and 35d have holes 351c and 351d.

Figure 7C:
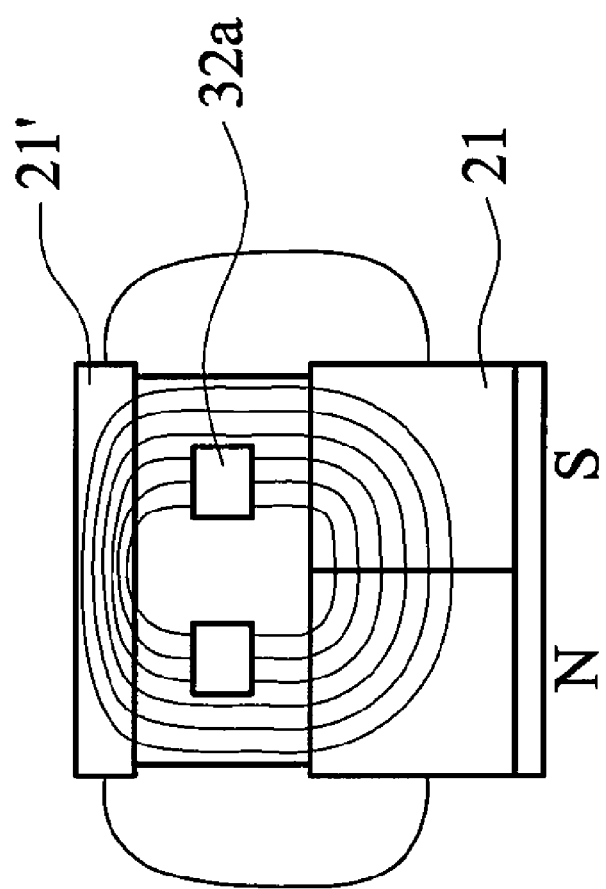

A coil with current I in a magnet field B has a force F exerted thereon. According to Lenz's law, F=i×B, as shown in FIG. 7b, the force F comprises a horizontal component Fx and a vertical component Fy. The horizontal component moves the coil in a horizontal direction, and the vertical component enable the coil to contact the magnet to increase the friction retarding the movement of the coil. The vertical component Fy is preferably small. Preferably, the magnetic field B is as vertical as possible. In the invention, a metal plate 21' and a pair of magnets 21 are employed, as shown in FIG. 7a, whereby the magnet flux passing through the coil is almost perpendicular to the horizontal plane, as shown in FIG. 7c. The vertical component Fy is almost 0, and the horizontal component Fx reaches the maximum.

A pair of first shafts 25 and 26 are parallel. A shorter first shaft 25 is disposed on the side of the magnets 21 and 24, and a longer first shaft 26 is disposed on the side of the magnet 23 away from the hollow portion 29. The longer first shaft 26 extends through the holes 351c and 351d and is held by the first holding portions 35c and 35d and fixed to the holding portions 25b and 25c. The shorter first shaft 25 extends through holes 351a and 351b and is fixed by the holding portion 25a. The first shafts 25, 26 and the holding portions 25a, 25b, 25c, 35a, 35b, 35c, 35d constitute a first guide element 60. The seat 30 moves along the second axis Y via the first guide element 60.

Referring to FIGS. 5 and 6, the seat 30 has a hollow portion 39. The image detection unit 50 is disposed in the hollow portion 39 on the movable plate 40. The movable plate 40 has a circuit board 45 to which the image detection unit 50 is electrically connected. A rectangular frame 46 is fixed to the circuit board 45 and surrounds the image detection unit 50. A pair of parallel frame walls 461 and 462 of the rectangular frame 46 have second holding portions 463a, 463b, 463c and 463d respectively. The second holding portions 463a, 463b, 463c and 463d have holes 4631a, 4631b, 4631c and 4631d respectively. A pair of second shafts 47 and 48 are parallel to the first axis X. The second shaft 47 extends through the holding portion 36a and 36b on the seat 30 into holes 4631a and 4631b and is fixed to the seat 30. The other second shaft 48 extends through the holding portions 36c and 36d and holes 4631c and 4631d, whereby the movable plate 40 is joined to the seat 30. The second shafts 47, 48 and the holding portions 36a, 36b, 36c, 36d, 463a, 463b, 463c, and 463d constitute a second guide element 70. The movable plate 40 moves along the first axis X via the second guide element 70.

Figure 8:
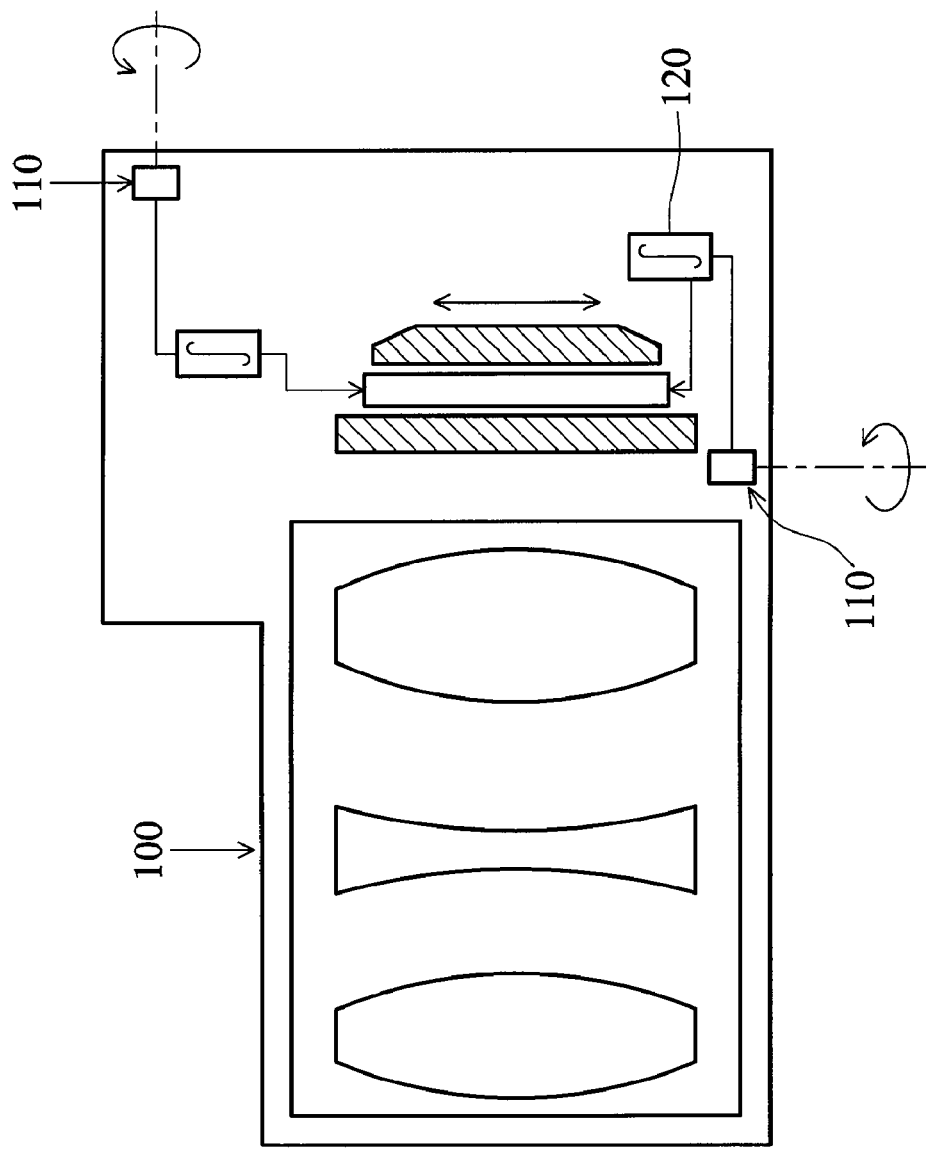
FIG. 8 is a schematic view of a camera comprising the image detection module of the invention.

FIG. 8 depicts a camera employing the image detection unit of the invention. Referring to FIGS. 3 and 7, a camera 100 comprises a motion sensor 110, such as an angular acceleration element or linear acceleration element. When the motion sensor 110 detects motion of the camera 100, a PWM circuit 120 or a digital circuit provides a voltage signal to the first coils 32a, 32b and the second coils 42a and 42b. The first coils 32a, 32b and the second coils 42a, 42b generate variable magnetic field interacting with the first magnet 21, 22, the first metal element 21', 22', the second magnet 23, 24 and the second metal element 23' and 24', whereby the seat 30 moves along the second axis Y, the movable plate 40 moves along the first axis X, and the image detection unit 50 moves along the first axis X and the second axis Y correspondingly. Blur is thereby modified or prevented When the camera 100 is still, the image detection module is also still. At this time, two halves of the first Hall element 44a are located on the N pole and the S pole of the first magnet 21, and two halves of the second Hall element 44b are located on the N pole and the s pole of the second magnet 23. The first and second Hall elements 44a and 44b detect no magnetic field variation. When the camera 100 is moved, the first and second coils 42a, 42b, 43a, 43b interact with the first magnet 21, 22, the first metal element 21', 22', the second magnet 23, 24 and the second metal element 23' and 24' to move the base 40 and the seat 30 along the first axis X and the second axis Y respectively. The Hall elements 44a and 44b detect variation of the magnetic field to calculate the displacement and motion frequency of the seat 30, whereby the voltage signal from the PWM circuit and the digital circuit is modified.

Because the invention changes the position of the image detection unit with respect to the optical axis rather than adjusting the lens position, image quality is retained. Further the pair of coils and pair of magnets moving the image detection unit allow the element to have small volume, providing reduced camera size.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image detection module, comprising:
    a base;
    a seat movably disposed on the base;
    an image detection unit disposed on the seat;
    a first guide member by which the seat is joined to the base, moving relative to the base in a first axis;
    a first coil disposed on either the base or the seat;
    a first magnet disposed on either the base or the seat and opposite to the first coil;
    a first metal element disposed on either the base or the seat, corresponding to the first magnet and the first coil between the first magnet and the first metal element; and
    a first Hall element disposed on either the base or the seat and adjacent to the first coil, wherein a magnetic force is generated between the first coil, the first magnet and the first metal element by a voltage provided to the first coil, moving the seat in the first axis along the first guide element.

2. The image detection module as claimed in claim 1, wherein the first guide element comprises:
    a plurality of first holding portions disposed on the base and the seat respectively;
    a pair of first shafts held parallel by the first holding portions, whereby the seat is joined to the base, and the seat moving along the axis of the first shaft.

3. The image detection module as claimed in claim 1, wherein the seat further comprises:
    a movable plate movably disposed on the seat;
    a circuit board joined to the movable plate, whereby the image detection unit is electrically connected to the circuit board and fixed on the base.

4. The image detection module as claimed in claim 3, further comprising:
    a second guide element by which the movable plate is joined to the seat and moves relative to the seat along a second axis;
    a second coil disposed on either the base or the movable plate;
    a second magnet disposed on the base or the movable plate and opposite to the second coil;
    a second metal element disposed on either the base or the seat, corresponding to the second magnet and the second coil between the second magnet an the second metal element; and
    a second Hall element disposed on either the base or the movable plate and adjacent to the second coil, wherein a magnetic force is generated between the second coil, the second magnet and the second metal element by a voltage provided to the second coil, thereby moving the seat along the second guide element along the second axis.

5. The image detection module as claimed in claim 4, wherein the second guide element comprises:
    a plurality of second holding portions disposed on the seat and the movable plate respectively; and
    a pair of second shafts held parallel by the second holding portions, whereby the movable plate is joined to the seat and moves along the axis of the second shaft.

6. The image detection module as claimed in claim 5, wherein the axis of the second shaft is perpendicular to the axis of the first shaft.

7. The image detection module as claimed in claim 4, wherein the second magnet comprises an N pole and an S pole disposed along the axis of the second shaft.

8. The image detection module as claimed in claim 7, wherein when the image detection module is still, two halves of the second Hall element are located on the N pole and the S pole of the second magnet respectively.

9. The image detection module as claimed in claim 4, wherein the second metal element is a metal plate.

10. The image detection module as claimed in claim 4, wherein the second metal element comprises ferromagnetic metal.

11. The image detection module as claimed in claim 1, wherein the first magnet comprises an N pole and an S pole disposed along the axis of the first shaft.

12. The image detection module as claimed in claim 10, wherein when the image detection module is still, two halves of the first Hall element are located on the N pole and the S pole of the first magnet respectively.

13. The image detection module as claimed in claim 1, wherein the first metal element is a metal plate.

14. The image detection module as claimed in claim 1, wherein the first metal element comprises ferromagnetic metal.

* * * * *